3,222,332
PROCESS FOR THE TERPOLYMERIZATION OF MONOOLEFINS
Edward W. Duck, Rinke Berkenbosch, and Henricus G. P. van der Voort, all of Amsterdam, Netherlands, assignors to Shell Oil Company, New York, N.Y., a corporation of Delaware
No Drawing. Filed Apr. 25, 1962, Ser. No. 189,968
Claims priority, application Netherlands, July 5, 1961, 266,693
6 Claims. (Cl. 260—80.5)

The process relates to the copolymerization of more than two olefinically unsaturated hydrocarbons with the aid of copolymerization catalysts of the Ziegler/Natta type and in the presence of a liquid diluent. The invention relates more particularly to the preparation of copolymers of ethylene with propylene and/or butene-1, in which moreover an alpha olefin with at least 5 carbon atoms is used as comonomer, preferably an alpha olefin with at least 8 and at most 16 carbon atoms. The new process leads to products with special properties, in particular to rubber-like products which are completely or almost completely amorphous and which possess favorable hysterisis properties after vulcanization.

Copolymerizations in which more than two olefinically unsaturated hydrocarbons are used as monomers and which are carried out with the aid of catalysts of the Ziegler/Natta type and in the presence of a liquid diluent are already known. Nothing is known about the order in which the monomers are brought into contact with the catalyst components may influence the properties of the copolymers.

The process of the invention differs from the known processes mentioned by the measures to be taken, by the nature of the polymerization products and by the rate at which the latter are formed.

It is an object of the present invention to provide a process for the preparation of improved copolymers of alpha olefins. It is a further object of the invention to provide an improved process for the preparation of copolymers obtained with a Ziegler or Natta type of catalyst. It is a particular object of the invention to provide a process for the preparation of copolymer having a high content of materials soluble in cold hexane and having particularly favorable hysteresis properties. Other objects will become apparent during the following detailed description of the invention.

Now, in accordance with the present invention, a process is provided for the preparation of rubber-like copolymers of ethylene with propylene and/or butene-1 and with, moreover, one or more alpha olefins with at least 5 carbon atoms, in the presence of inert liquid diluents and copolymerization catalysts of the Ziegler/Natta type, which is characterized in that the alpha olefins with at least 5 carbon atoms are added to one of the catalyst-forming components before the latter are brought into contact with each other or with the other olefins.

Alpha olefins with at least 5 carbon atoms (pentene-1, hexene-1, etc.) may be used but alpha olefins with at least 8 and at most 16 carbon atoms, are preferred. These include octene-1, dodecene-1, hexadecene-1 or mixtures containing one or more of such olefins, such as mixtures which are obtained in the cracking of paraffinic hydrocarbons. It is preferred that the copolymers contain at least 0.5 mol percent (e.g., 0.75–10 mol percent) of $C_{5-16}$ olefins.

Suitable copolymerization catalysts are mainly all catalysts of the Ziegler/Natta type with which may be prepared rubber-like copolymers of ethylene with propylene and/or butene-1 or predominantly amorphous homopolymers, for instance amorphous polypropylene. The catalyst to be utilized in the process of this invention preferably comprises a mixture of components A and B, component A being a halide of a metal of Groups IV, V and VI of the Periodic Table and component B being a compound of metal of Groups I, II and III of the Periodic Table, in which at least one of the valences of the component B metal is satisfied by a lower alkyl ($C_{2-5}$) radical and the remaining valences, if any, are satisfied by a substituent of the group consisting of lower alkyl, oxyalkyl and halogen radicals.

The transition metal halides include the halides of titanium, zirconium, hafnium, thorium, vanadium, tantalum, molybdenum, chromium, tungsten and uranium and preferably comprise the halides in which the metal has less than its maximum valence, e.g., is a sub-halide. Catalysts that are particularly suitable for the process under consideration may be obtained, for instance, by using one of the following combinations of catalyst-forming components, which are usually employed with mol ratios varying from 1:10 to 10:1.

(a) Titanium trihalide ($TiCl_3$) together with a compound of the type $AlR_2(OR)$ or $AlR_3$, in which the symbols R indicate the same or different hydrocarbon radicals, for instance $Al(C_2H_5)_2(OC_2H_5)$.

(b) A vanadium trihalide, for instance $VCl_3$, together with a compound of the type $AlR_2$ (halogen) or $AlR_3$ where the symbols R again stand for the same or different hydrocarbon radicals, for instance $Al(C_2H_5)_2Cl$.

(c) A vanadium oxyhalide, for instance $VOCl_3$ or $VOCl_2$, together with a compound of the type $AlR_n$ (halogen)$_{3-n}$ in which R represents a hydrocarbon radical and $n$ is equal to at most 3, but is higher than 0, for instance, an aluminum alkylsesquihalide, such as Al isobutyl sesquichloride.

Whenever in the above-mentioned combination (a), (b), (c) a trialkyl compound is used as catalyst-forming component, the aluminum trialkyls whose alkyl groups contain more than 5 carbon atoms, for instance aluminum tri-n-hexyl or aluminum n-decyl, are preferable.

In the process of the invention the usual types of substantially inert diluent may be used, both aliphatic and aromatic hydrocarbons, as well as chlorinated hydrocarbons, for instance iso-octane, benzene and tetrachloroethane. It is preferred practice to maintain a bound ethylene content in the copolymer of 50–90 mol percent.

The copolymerization process can be carried out both at atmospheric and at higher pressure, for instance at pressures between 1 and 50 atmospheres at 0–250° C. (preferably 50–100° C.) for 0.1–10 hours.

The copolymers that are prepared according to the new process differ from the products that are obtained if, under otherwise equal conditions, the special measures with respect to the addition of the higher olefins are disregarded, by their better solubility in cold hexane. After vulcanization these copolymers further possess certain very favorable properties. For instance, their hysteresis properties are particularly attractive (slight heat build-up, great resilience and high abrasion resistance).

which the olefins and the catalyst-forming components were added, as well as the yield and a number of properties of the copolymers obtained.

TABLE I

| Exp. No. | Order of Adding Catalyst-Forming Components and Monomers | Copolymer | | | |
|---|---|---|---|---|---|
| | | Yield, g./l. | Intrinsic Viscosity | $C_3$ Content, Percent w. (I.R. Determ.) | Cold-Hexane Solubility, Percent w. |
| 1 | $(Al(C_2H_5)_2(OC_2H_5))$+gamma $TiCl_3$; $C_2/C_3$ Mixture. | 60 | 4.8 | 40 | 60 |
| 2 | $(Al(C_2H_5)_2(OC_2H_5))$+gamma $TiCl_3$; $C_{12}$; $C_2/C_3$ Mixture. | 46 | 3.6 | 35 | 66 |
| 3 | $(Al(C_2H_5)_2(OC_2H_5))$; (gamma $TiCl_3$+$C_{12}$); $C_2/C_3$ Mixture. | 53 | 2.5 | 29 | 76 |
| 4 | $(C_{12}+Al(C_2H_5)_2(OC_2H_5))$; gamma $TiCl_3$; $C_2/C_3$ Mixture. | 57 | 2.2 | 33 | 80 |

The new polymers are valuable products also in an unvulcanized condition. For instance, they are very suitable for use as lubricating oil additive. After addition to lubricating oils they impart to the latter a higher viscosity index, while the oils thus obtained nevertheless show satisfactory shear stability.

*Example I*

Four copolymerization experiments were carried out in 800 ml. of isooctane with brisk stirring and using the reaction product (gamma $TiCl_3$) obtained at 170° C. from 5 mm. of $TiCl_4$ and 1⅔ mm. of $Al(C_2H_5)_3$ per liter, further 15 mm. of $Al(C_2H_5)_2(OC_2H_5)$ per liter and a gaseous feed consisting of a $C_2/C_3$ mixture of 60% m. of ethylene and 40% m. of propylene, which mixture was passed through at an average rate of 60 liters per hour. The polymerization temperature was 65° C., the time of polymerization one hour. In three of the experiments, moreover, 20 ml. of dodecene-1 was included in the copolymerization under various conditions as far as the order of its addition was concerned.

At the end of the copolymerization process 5 to 10 ml. of a hydrochloric acid/methanol mixture was added to inactivate the catalyst. Subsequently, the reactor contents were poured out into an equal quantity of ethanol. After separation the copolymer was washed out with ethanol and dried in vacuo at 60° C. Table I gives the order in

*Example II*

Three copolymerization experiments were carried out in 800 ml. of isooctane, using 10 mmoles of $VOCl_3$ and 20 mmoles of aluminum isobutylsesquichloride per liter and a gaseous feed consisting of a $C_2/C_3$ mixture of 50% m. of ethylene and 50% m. of propylene. The other conditions were the same as stated in Example I. Table II gives the order in which the catalyst-forming components and monomers were added, as well as the yield and some properties of the copolymers obtained.

TABLE II

| Exp. No. | Order of Adding Catalyst-Forming Components and Monomers | Copolymer | | | |
|---|---|---|---|---|---|
| | | Yield, g./l. | Intrinsic Viscosity | $C_3$ Content, Percent m. (I.R. Determ.) | Cold-Hexane Solubility, Percent m. |
| 1 | $VOCl_3$+$AliBu_{1½}Cl_{1½}$; $C_2/C_3$-Mixture | 40 | 4.1 | 44 | 93 |
| 2 | $(VOCl_3$+$AliBu_{1½}Cl_{1½})$; $C_{12}$; $C_2/C_3$-Mixture | 33 | 3.7 | 30 | 79 |
| 3 | $(C_{12}+VOCl_3)$; $AliBu_{1½}Cl_{1½}$; $C_2/C_3$-Mixture | 61 | 2.8 | 35 | 99 |

*Example III*

The copolymers obtained in the four experiments of Example I and 3 of Example II were vulcanized at 150° C. for 1 hour, in which the following formulation was used; copolymer 100, MgO 1, carbon black (high abrasion furnace) 50, sulfur 0.6 and dicumyl peroxide 4 parts by weight. For comparison, ethylene/propylene copolymers which had been prepared with the same catalyst systems but in the absence of dodecene-1 and of which Table III gives the intrinsic viscosity, $C_3$ content and cold-hexane solubility, were vulcanized in the same way. The vulcanization results are also included in Table III.

TABLE III

|  | Properties | | | |
| --- | --- | --- | --- | --- |
|  | $C_2/C_3$-Copolymer | $C_2/C_3/C_{12}$-Copolymer of Exp. 4 of Ex. I | $C_2/C_3$-Copolymer | $C_2/C_3/C_{12}$-Copolymer of Exp. 3 of Ex. II |
|  | Prepared using catalyst system: $TiCl_3+Al(C_2H_5)_2(OC_2H_5)$ | | Prepared using catalyst system: $VOCl_3+AlIBu_{1\frac{1}{2}}Cl_{1\frac{1}{2}}$ | |
| BEFORE VULCANIZATION | | | | |
| Intrinsic Viscosity | 2.4 | 2.2 | 3.1 | 2.8 |
| Percent m. $C_3$ in Copolymer | 45 | 33 | 45 | 35 |
| Percent m. $C_{12}$ in Copolymer |  | 1 |  | 1 |
| Percent w. Soluble in Cold Hexane | 68 | 80 | 80 | 99 |
| AFTER VULCANIZATION | | | | |
| Yield Stress, kg./cm.$^2$ | 181 | 191 | 238 | 210 |
| Elongation at rupture, percent | 367 | 398 | 439 | 467 |
| Modulus (300%), kg./cm.$^2$ | 139 | 135 | 132 | 104 |
| Heat Build-up ($\Delta T$), °C | 53 | 41 | 42 | 33 |
| Resilience, Percent | 53 | 59 | 59 | 60 |
| Abrasion Resistance Index (12° C.) |  |  | 140 | 177 |
| Set at Break, Percent | 47 | 18 | 8 | 7 |

*Example IV*

Experiments 1 and 4 of Example I were repeated, the difference being that this time the $C_2/C_3$-mixture consisted of 40% m. of ethylene and 60% of propylene, the dodecene-1 being labelled with the isotope $C_{14}$. Experiments 1 and 3 of Example II were also repeated, but with an ethylene/propylene mixture whose composition was not changed (50% m. of propylene). In this case, too, the dodecene-1 was labelled with the isotope $C_{14}$. The dodecene-1 content of the copolymers concerned was determined radiographically. The results obtained as well as the yield and some properties of the resulting copolymers are given in Table IV.

*Example VI*

Experiment 4 of Example I was repeated, the difference being that instead of gamma $TiCl_3$ the reaction product obtained at 170° C. from 5 moles of $VCl_4$ and 2.5 mmoles of $Al(C_2H_5)_2Cl$ per liter and instead of 15 moles of $Al(C_2H_5)_2(OC_2H_5)$, 10 mmoles of aluminum diethychloride per liter was used, and that the molar ratio of the ethylene/propylene mixture was 70:30. The yield of the terpolymer formed was 60 g. per liter, its intrinsic viscosity 2.3, its propene content 25% m. and its solubility in cold hexane 75% w.

TABLE IV

| Monomers | Catalyst System, mmoles/liter | Copolymer | | | | | Quantity Copolymerized $C_{12}$ Calculated on Quantity Added, Percent w. |
| --- | --- | --- | --- | --- | --- | --- | --- |
|  |  | Yield, g./l. | Intrinsic Viscosity | Cold-Hexane Solubility, Percent w. | $C_3$-Content Percent m. (I. R. Determ.) | $C_{12}$ Content (Radio-Graphic Determ.) Percent w. |  |
| Ethylene and Propylene (Molar Ratio 40:60). | 5 gamma $TiCl_3$+15 $Al(C_2H_5)_2(OC_2H_5)$ | 100 | 2.5 | 78 | 57 |  |  |
| Ethylene, Propylene (Molar Ratio 40:60) and Dodecene-1.* | 5 gamma $TiCl_3$+15 $Al(C_2H_5)_2(OC_2H_5)$ | 126 | 1.6 | 86 | 53 | 15 | 100 |
| Ethylene and Propylene (Molar Ratio 50:50). | 10 $VOCl_3$+20 $AliBu_{1\frac{1}{2}}Cl_{1\frac{1}{2}}$ | 40 | 4.1 | 93 | 44 |  |  |
| Ethylene, Propylene (Molar Ratio 50:50) and Dodecene-1.** | 10 $VOCl_3$+20 $AliBu_{1\frac{1}{2}}Cl_{1\frac{1}{2}}$ | 63 | 2.6 | 99 | 35 | 21 | 70 |

*Order of addition: $C_{12}+Al(C_2H_5)_2(OC_2H_5)$; $TiCl_3$; $C_2C_3$-mixture.
**Order of addition: $C_{12}+VOCl_3$; $AliBu_{1\frac{1}{2}}Cl_{1\frac{1}{2}}$; $C_2/C_3$-mixture.

*Example V*

Experiments 1 and 4 of Example I were repeated, the difference being that an equal quantity of aluminum tridecyl was used instead of diethyl aluminum ethoxide. The results of these experiments are shown in Table V.

*Example VII*

A quantity of a terpolymer prepared in a way analogous to that of Experiment 3 of Example II was dissolved into a base lubricating oil with a kinematic viscosity of 48.2 centistokes at 100° F. (KV 100), a kine-

TABLE V

| Order of Addition | Copolymers | | | |
| --- | --- | --- | --- | --- |
|  | Yield, g./l. | Intrinsic Viscosity | $C_3$ Content (I.R. Determ.) percent m. | Cold-Hexane Solubility, percent w. |
| $(Al(C_{10}H_{21})_3)$+gamma $TiCl_3$); $C_2/C_3$-mixture | 60 | 2.4 | 44 | 69 |
| $(C_{12}+Al(C_{10}H_{21})_3)$; gamma $TiCl_3$; $C_2/C_3$-mixture | 80 | 1.6 | 35 | 80 | matic viscosity of 6.8 centistokes at 210° F. (KV 210) and a viscosity index (V.I.) of 105. The terpolymer differed from the polymer obtained in Experiment 3 of Example II only in that its intrinsic viscosity was 2.5 instead of 2.8. The quantity of terpolymer added to the base oil was such that there resulted a 1% w. solution of this polymer in the oil. After filtration the $KV_{100}$ of this solution was 109.1, the $KV_{210}$ 15.0 centistokes, the V.I. having risen to 132 by the addition of the terpolymer.

To evaluate the shear stability the following experiment was carried out: 600 g. of the above-mentioned solution was put in a beaker 15 cm. high and with a capacity of one liter and brought to a temperature of 50° C. and afterwards subjected to intense stirring with an ultra-turrax stirrer for 15 minutes at a rate of 10,000 r.p.m. while cooling with ice water. Then the $KV_{100}$, the $KV_{210}$ and the V.I. of the solution were determined, and subjected once more to the same treatment for 15 minutes. The $KV_{100}$, the $KV_{210}$ and the V.I. were determined also after the second treatment. In the former stirring treatment the temperature rose to 75° C., in the latter to 73° C.

The results obtained are shown in Table VI.

TABLE VI

|  | $VK_{100}$ | $VK_{210}$ | V.I. |
|---|---|---|---|
| Before the experiment | 109.1 | 15.0 | 131.5 |
| After the first stirring treatment | 101.1 | 14.0 | 131 |
| After the second stirring treatment | 98.3 | 13.8 | 131 |

We claim as our invention:

1. In the process for the copolymerization of ethylene with a $C_{3-4}$ alpha-olefin and a higher alpha-olefin having at least 5 carbon atoms per molecule with a catalyst comprising as component A a halide of the group consisting of titanium chlorides, vanadium oxychlorides and vanadium chlorides and as component B a compound of the group consisting of aluminum trialkyls, aluminum alkyl halides and aluminum alkyl oxyalkyls, the improvement which provides better efficiency of catalyst components and higher cold solubility in hexane of the resulting product comprising admixing the higher olefin with only one catalyst component and thereafter with the remaining catalyst component and with ethylene and $C_{3-4}$ alpha-olefin.

2. A process according to claim 1 where the higher olefin is a $C_{8-16}$ olefin.

3. A process according to claim 1 wherein catalyst component A is titanium trichloride and component B is an aluminum alkyl compound.

4. A process according to claim 1 wherein catalyst component A is a vanadium halide compound and component B is an aluminum alkyl compound.

5. A process according to claim 1 wherein the higher olefin is a $C_{8-16}$ olefin which is added to catalyst component A and thereafter mixed with component B and with a mixture of ethylene and propylene.

6. A process according to claim 1 wherein the higher olefin is a $C_{8-16}$ olefin which is added to catalyst component B and thereafter mixed with component A and with a mixture of ethylene and propylene.

References Cited by the Examiner

UNITED STATES PATENTS 2,933,480  4/1960  Gresham et al. _____ 260—80.5
2,975,159  3/1961  Weinmayr _____ 260—80.5

FOREIGN PATENTS 538,782  12/1955  Belgium.

JOSEPH L. SCHOFER, *Primary Examiner.*
JOSEPH R. LIBERMAN, *Examiner.*